(12) United States Patent  
Gunderson

(10) Patent No.: US 7,443,554 B1
(45) Date of Patent: Oct. 28, 2008

(54) TILTED PLATE DITHER SCANNER

(75) Inventor: John Gunderson, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/435,469

(22) Filed: May 16, 2006

(51) Int. Cl.
*G02B 26/08* (2006.01)

(52) U.S. Cl. ...................... 359/196; 359/209

(58) Field of Classification Search ......... 359/196–213, 359/245, 299, 305, 871
See application file for complete search history.

(56) References Cited

U.S. PATENT DOCUMENTS

| | | | | |
|---|---|---|---|---|
| 4,637,004 A | * | 1/1987 | Araki et al. .............. 369/44.32 |
| 5,151,581 A | * | 9/1992 | Krichever et al. ........... 235/454 |
| 5,365,288 A | * | 11/1994 | Dewald et al. ................ 353/98 |
| 6,971,579 B2 | * | 12/2005 | Barkan et al. .......... 235/462.38 |
| 2002/0075258 A1 | * | 6/2002 | Park et al. .................... 345/419 |
| 2002/0159101 A1 | | 10/2002 | Alderson |
| 2002/0159648 A1 | | 10/2002 | Alderson et al. |
| 2002/0159651 A1 | | 10/2002 | Tener et al. |
| 2003/0198400 A1 | | 10/2003 | Alderson |

\* cited by examiner

*Primary Examiner*—Euncha P Cherry
(74) *Attorney, Agent, or Firm*—Jeffrey D. Myers; Timothy D. Stanley; Peacock Myers, P.C.

(57) ABSTRACT

An optical apparatus and a method of using an optical instrument comprising providing to a primary optical axis of the instrument a plate tilted so as not to be perpendicular to the primary optical axis and continuously rotating the plate about the primary optical axis.

10 Claims, 1 Drawing Sheet

TILTED PLATE DITHER SCANNER

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to extended range image processing, particularly of image data acquired via Electro-Optical (EO) systems.

2. Description of Related Art

The present invention relates to extended range (XR™) image processing of image data acquired via EO systems, as described in references such as: (1) U.S. patent application Ser. No. 09/840,920, entitled "Scene-based non-uniformity correction for detector arrays", filed Apr. 25, 2001, and published as Publication No. 2002/0159101 on Oct. 31, 2002; (2) U.S. patent application Ser. No. 09/841,081, entitled "Dynamic range compression", filed Apr. 25, 2001, and published as Publication No. 2002/0159648 on Oct. 31, 2002; (3) U.S. patent application Ser. No. 09/841,079, entitled "Extended range image processing for electro-optical systems", filed Apr. 25, 2001, and published as Publication No. 2002/0159651 on Oct. 31, 2002; and (4) U.S. patent application Ser. No. 10/125,348, entitled "Scene-based non-uniformity offset correction for staring arrays", filed Apr. 19, 2002, and published as Publication No. 2003/0198400 on Oct. 23, 2003.

One technique for addressing the range performance and Nyquist frequency limitations of an EO system is to dither the system, such that the system will sample once, then move the sensor over some sub-pixel amount, and then sample again. Such a technique gives the EO system the appearance that the image is sampled twice as often, and, therefore, the Nyquist frequency of the sensor has effectively doubled. This is often implemented using a dither mechanism such as a Fast Scan Mirror (FSM). However, dither mechanisms, such as a FSM, are usually very expensive and are sensitive to vibrations and alignment. Previous implementations also have comprised rotating cube prisms or oscillating plates which provide linear rather than rotary scans. Two mechanisms with separate tilted optical plates or prisms are required for orthogonal linear motion.

The present invention employs a property of a tilted plane parallel plate used in a converging beam of an imaging system, namely that of deviating the line of sight of the image. The invention uses a rotating motion of the tilted plate along an axis parallel to the line of sight to provide a continuously rotating deviation or dither to the image. The line of sight moves in two axes with a single mechanism.

BRIEF SUMMARY OF THE INVENTION

The present invention is of an optical apparatus and a method of using an optical instrument, comprising: providing to a primary optical axis of the instrument a plate tilted so as not to be perpendicular to the primary optical axis; and continuously rotating the plate about the primary optical axis. In the preferred embodiment, rotating employs a motor driving the continuous rotation. The plate comprises a housing, and the motor drives the continuous rotation via the outside edge of the housing, preferably via a gear. The instrument is preferably an Electro-Optical system, most preferably one employing XR processing of collected images. Images are collected from the instrument offset at the focal plane from the primary optical axis, and the point of offset at the focal plane continuously rotates about the primary optical axis. The plate is preferably glass.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method and apparatus for EO systems, particularly those using XR processing, comprising imparting a rotating motion of a tilted plate along an axis parallel to the line of sight to provide a continuously rotating deviation or dither to the received image. This results in the line of sight moving in two axes with a single mechanism. For an unstabilized, cooled or uncooled sensor without a Fast Steering Mirror (FSM), using a rotating tilted plate provides a simple, low cost, low profile method of providing dither with only one axis of constant velocity rotation. Oscillating motion is not required.

A rotary scan is all that is required for the XR algorithm, so a single mechanism is more inexpensive and smaller than two. Other types of scanners operate in front of the optical system where the mechanism is much larger. The invention can be used directly in front of the image plane. Note that the invention should not be confused with Risley scanners, which are actually wedge scanners. Although Risley scanners are commonly used for steering a beam, they can cause unacceptable chromatic blurring of the image and degraded image quality. The tilted plate of the invention causes only a minor astigmatic aberration which is much less of a problem, particularly for XR applications.

Figure 1:
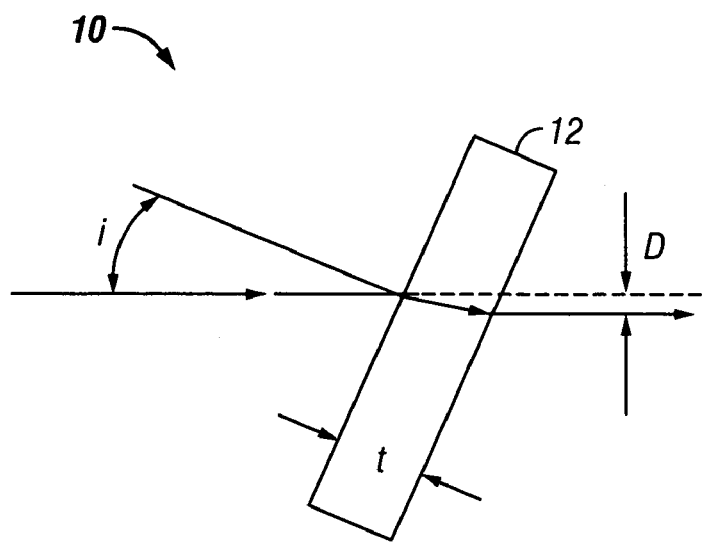
FIG. 1 is a schematic diagram illustrating the method and apparatus of the invention.

FIG. 1 illustrates the method and apparatus 10 of the invention. The image offset of a plane parallel tilted plate 12 is as follows: For small angles of tilt, the formula is: $D=ti(n-1)/n$ where n is the refractive index of the material forming the plate (e.g., glass). When used in a converging beam of light near focus, the image location moves back (defocus) and is offset laterally by D. Typical values are D=0.005 inch with n=2.40, i=5°, t=0.1 inch.

Figure 2:
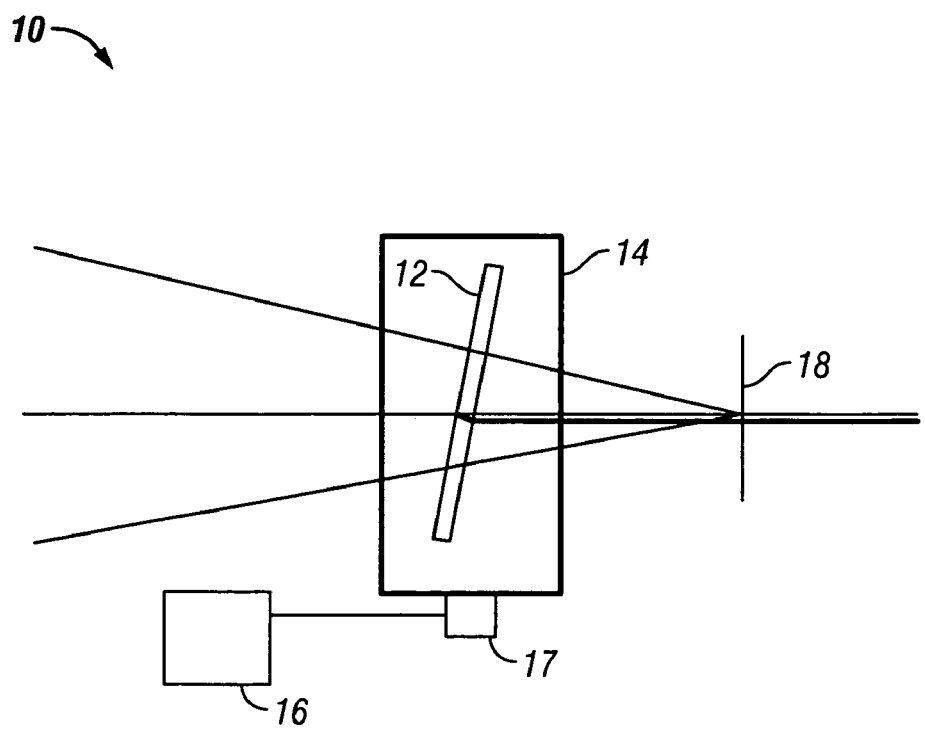
FIG. 2 is a schematic diagram further illustrating the method and apparatus of the invention.

FIG. 2 further illustrates the method and apparatus of the invention. Motor 16 imparts rotary motion to the tilted plate, for example via housing 14 or equivalent structure, such as a simple attachment to the outside diameter of the tilted plate or its housing, such as via a gear 17. Accordingly, collected images will be always offset slightly from the true line of sight at focal plane 18 of the optical instrument incorporating the invention. The defocus of the tilted plate can be accommodated by moving the sensor back by the amount of the defocus.

Advantages of the present invention include that: (1) The tilted plate rotates at a constant angular rate on an axis parallel to the beam (line of sight); (2) The single-axis drive mechanism provides circular image motion; (3) No oscillating motion is required; and (4) A simple motor drive can be employed. Most current dither mechanisms require oscillating motion or two mechanical drives for two axes of image motion. A rotating Risley wedge prism provides a circular scan but degrades the image quality.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An optical apparatus comprising a glass plate continuously rotatable about a primary optical axis of the apparatus, wherein said plate is plane parallel and tilted so as not to be perpendicular to the primary optical axis; a housing of said plate; and a motor driving continuous rotation of said plate via a gear, wherein said gear directly contacts the outside edge of said housing of said plate.

2. The optical apparatus of claim 1 wherein said apparatus is an Electro-Optical system.

3. The optical apparatus of claim 2 wherein said apparatus employs XR processing of collected images.

4. The optical apparatus of claim 1 wherein collected images are offset at the focal plane from the primary optical axis.

5. The optical apparatus of claim 4 wherein the point of offset at the focal plane continuously rotates about the primary optical axis.

6. A method of using an optical instrument, the method comprising the steps of:

providing to a primary optical axis of the instrument a glass plate that is plane parallel and tilted so as not to be perpendicular to the primary optical axis, wherein the plate comprises a housing; and continuously rotating the plate about the primary optical axis by employing a gear driven by a motor, which gear directly contacts the outside edge of the housing of the plate.

7. The method of claim 6 wherein the instrument is an Electro-Optical system.

8. The method of claim 7 wherein the instrument employs XR processing of collected images.

9. The method of claim 6 additionally comprising collecting images from the instrument offset at the focal plane from the primary optical axis.

10. The method of claim 9 wherein the point of offset at the focal plane continuously rotates about the primary optical axis.

\* \* \* \* \*